United States Patent
King-Yang

[11] Patent Number: 5,822,870
[45] Date of Patent: Oct. 20, 1998

[54] LEVEL CONTROLLER

[76] Inventor: Ro King-Yang, No. 289, Yong-Keng Road, Feng-Yuan City, Taichung County, Taiwan

[21] Appl. No.: 700,040

[22] Filed: Aug. 20, 1996

[51] Int. Cl.[6] .................................................. G01C 9/06
[52] U.S. Cl. .................................. 33/1 M; 33/366; 33/391
[58] Field of Search ........................... 333/366, 391, 333/1 M, 333, 370, 371, 1 AA, 365, 395, 401; 356/139.1, 148, 149; 248/188.3, 550

[56] References Cited

U.S. PATENT DOCUMENTS

| | | | |
|---|---|---|---|
| 824,525 | 6/1906 | Bonney | 33/333 |
| 3,206,151 | 9/1965 | Lillestrand | 33/333 |
| 3,836,162 | 9/1974 | Felkner | 248/188.3 |
| 4,159,577 | 7/1979 | Bergkvist | 33/366 |
| 4,265,027 | 5/1981 | Burniski | 33/366 |
| 4,277,895 | 7/1981 | Wiklund | 33/366 |
| 4,492,029 | 1/1985 | Tanaka et al. | 33/366 |
| 4,533,830 | 8/1985 | Beauprey | 33/1 M |
| 4,866,380 | 9/1989 | Meins et al. | 324/207 |
| 4,922,620 | 5/1990 | Terragni | 33/366 |
| 5,366,196 | 11/1994 | Mitschelen et al. | 248/550 |

*Primary Examiner*—Thomas B. Will
*Assistant Examiner*—Andrew Hirschfeld
*Attorney, Agent, or Firm*—Rosenberg, Klein & Bilker

[57] ABSTRACT

A level controller including a base plate having an upright support, a platform supported on and turned about the upright support, a status detector mounted on the bottom side of the platform to detect the position of the platform through an X-axis detector unit and a Y-axis detector unit and to provide an output signal corresponding to the result of the detection, a X-axis motor and a Y-axis motor arranged on the base plate at right angles, and a microprocessor controlled by the X-axis detector unit and Y-axis detector unit of the status detector to turn the X-axis motor and the Y-axis motor in keeping the platform on an even horizontal plane.

2 Claims, 10 Drawing Sheets

LEVEL CONTROLLER

BACKGROUND OF THE INVENTION

A variety of apparatus have been developed for determining or adjusting a surface to an even horizontal plane. These apparatus include water levels, air levels, gyroscopic levels. A water level comprises a glass tube partly filled with liquid in which the water levels at two opposite ends of the glass tube are maintained at the same elevation when the instrument is on an even horizontal plane. This structure of water level is manually operated. During the operation, much time is wasted in adjusting the instrument to the horizontal position. Another drawback of this structure of water level is that it can only determine an even horizontal plane, however it cannot provide a control signal to control the operation of a machine or the like. Therefore, the application of this structure of water level is limited. Still another drawback of this structure of water level is that it determines an even horizontal plane on one (X-axis) direction only. Because this structure of water level is adjusted manually, it is less precise. An air level comprises a glass tube partly filled with liquid so as to leave an air bubble that moves to the exact center of the tube when the instrument is on an even horizontal plane. This structure of air level is less precise because it is manually operated. Because this structure of air level can only determines an even horizontal plane on one direction only, it cannot provide a control signal to control the operation of a machine or the like. A gyroscopic level is an electromagnetic type precision instrument that controls the level automatically. However, this instrument is expensive and complicated to manufacture. This structure of gyroscopic level is practical for use in conditions in which dynamic status changes frequently. The installation of this instrument requires special techniques. The operation of this instrument is also difficult to learn. Therefore, this structure of gyroscopic level is commonly used in airplanes, missiles, etc.

SUMMARY OF THE INVENTION

The present invention has been accomplished to provide a level controller which eliminates the aforesaid drawbacks. It is one object of the present invention to provide a level controller which automatically monitors the position status of the controlled platform. It is another object of the present invention to provide a level controller which automatically provides a control signal to a driving mechanism, causing it to move the controlled platform to the horizontal position when the controlled platform is tilted. It is still another object of the present invention to provide a level controller which can be adjusted automatically. It is still another object of the present invention to provide a level controller which is simple in structure. It is still another object of the present invention to provide a level controller which is high sensitive. It is still another object of the present invention to provide a level controller which operates efficiently. It is still another object of the present invention to provide a level controller which is inexpensive to manufacture. It is still another object of the present invention to provide a level controller which is easy to install. It is still another object of the present invention to provide a level controller which provides a broad application range. According to one aspect of the present invention, the level controller comprises a base plate having an upright support, a platform supported on and turned about the upright support, a status detector mounted on the bottom side of the platform to detect the position of the platform through an X-axis detector unit and a Y-axis detector unit and to provide an output signal corresponding to the result of the detection, a X-axis motor and a Y-axis motor arranged on the base plate at right angles, and a microprocessor controlled by the X-axis detector unit and Y-axis detector unit of the status detector to turn the X-axis motor and the Y-axis motor in keeping the platform on an even horizontal plane. According to another aspect of the present invention, the X-axis detector unit and the Y-axis detector unit are respectively comprised of a light source, light sensor means, and a light chopper turned about a X-axis axle or Y-axis axle between the respective light source and the respective light sensor means. Therefore, the light sensor means of the X-axis detector unit or Y-axis detector unit provides a signal to the microprocessor corresponding to the degree of tilt of the platform in the X-axis or Y-axis direction, causing the microprocessor to turn the X-axis motor or Y-axis motor in moving the platform back to the horizontal position. According to still another aspect of the present invention, the light sensor means of the X-axis detector unit or the Y-axis detector unit can be comprised of a digital light sensor and an analog light sensor, or two digital light sensors.

DETAILED DESCRIPTION OF THE PREFERRED EMBODIMENT

Figure 1:
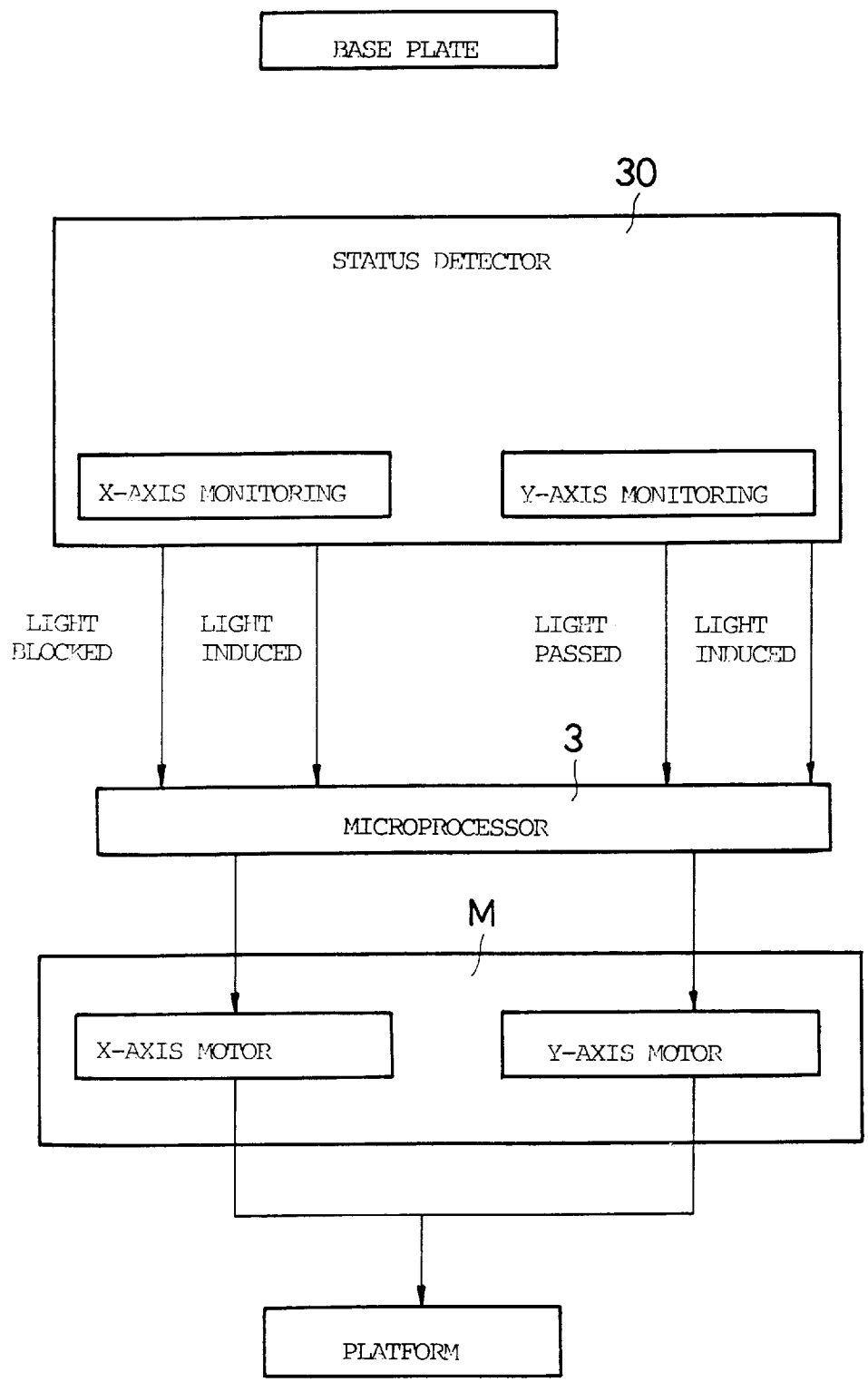
FIG. 1 is a control block diagram of the present invention.
Figure 2:
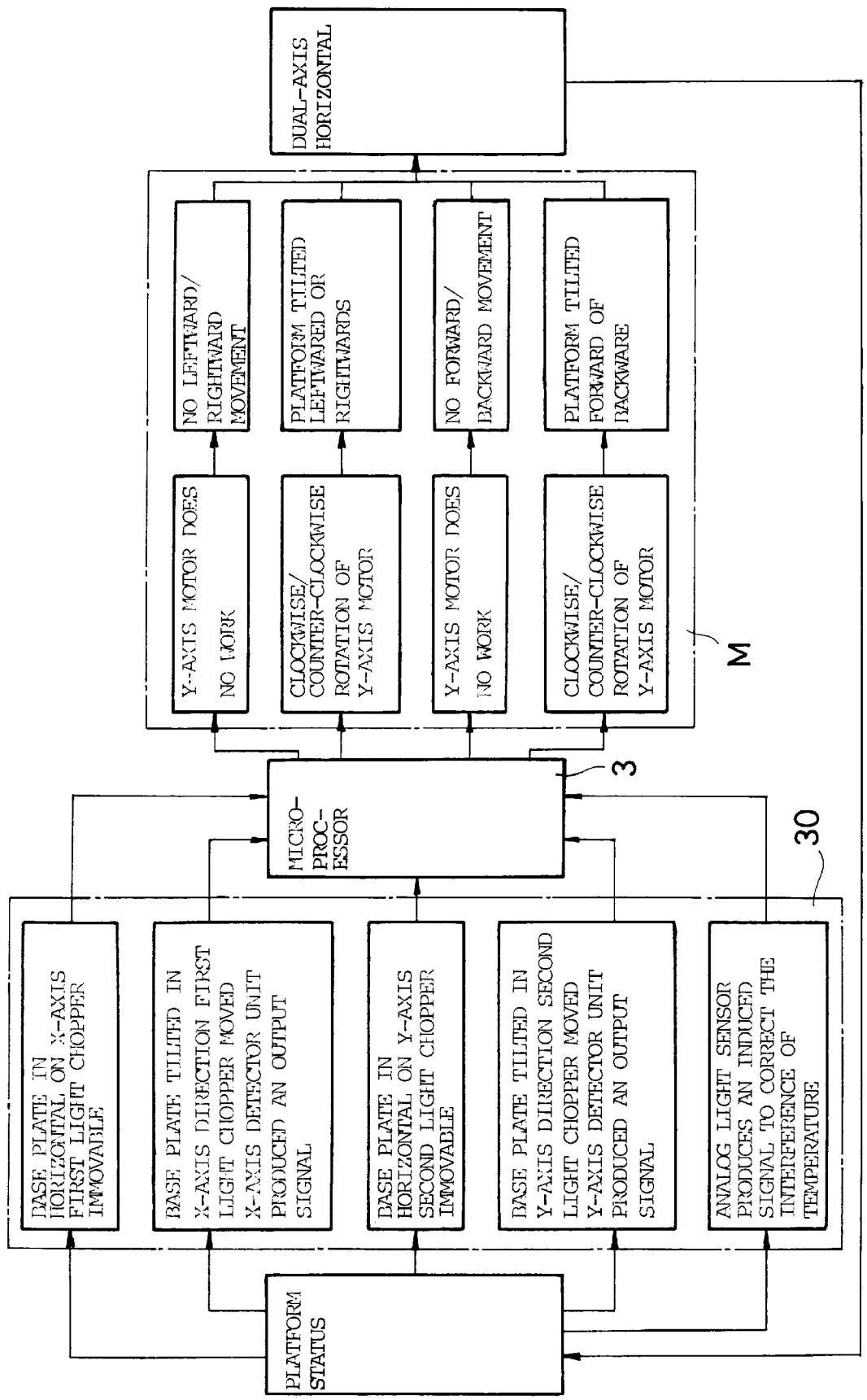
FIG. 2 is a control flow chart of the present invention.

Referring to FIGS. 1 and 2, a level controller in accordance with the present invention is generally comprised of a status detector 30, a microprocessor 3, and a driving mechanism M, and operated to keep a platform 2 on an even horizontal plane.

Figure 3:
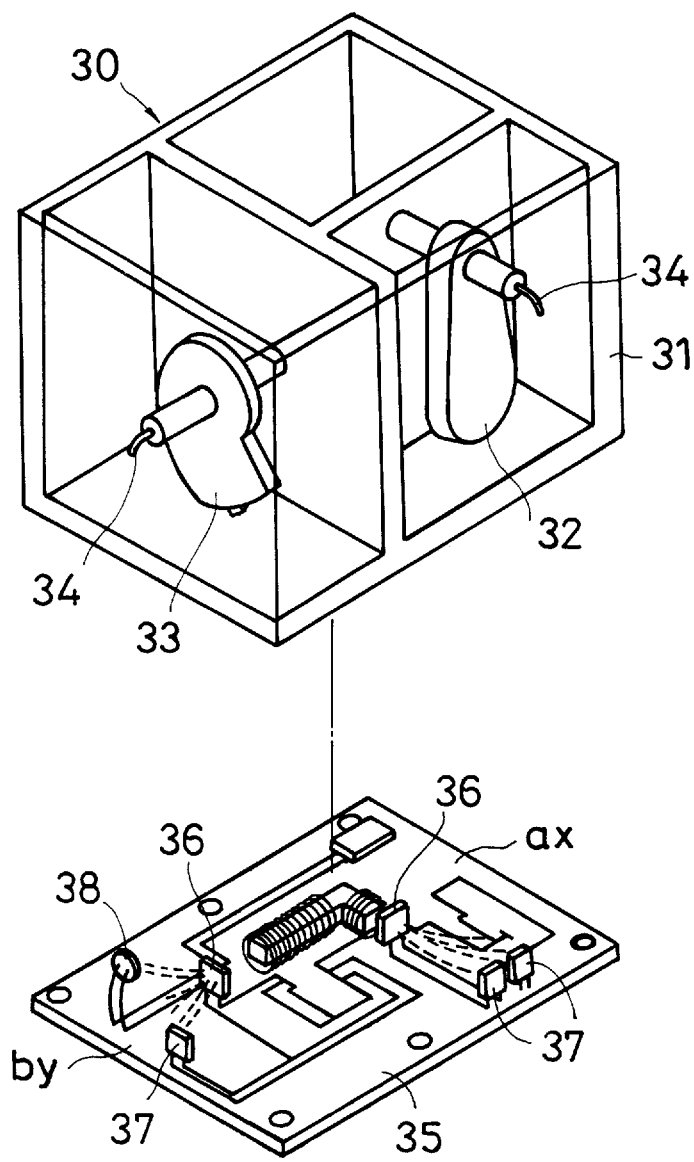
FIG. 3 is an exploded view of a status detector according to the present invention.
Figure 3A:
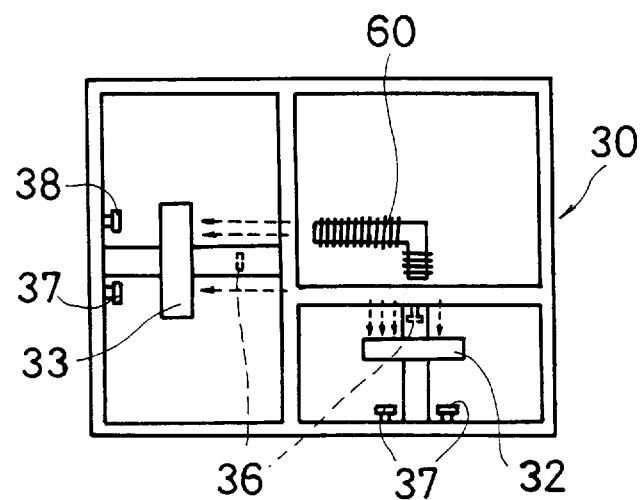
FIG. 3A is a sectional view of the status detector, showing the operation of the damping coil according to the present invention.

The status detector 30 (see FIG. 3) comprises a casing 31, and a circuit board 35 fastened to the casing 31. The casing 31 comprises two axles 34 arranged at right angles, a first light chopper 32 and a second light chopper 33 respectively turned about the axles 34. The first light chopper 32 can be oscillated in X-axis direction. The second light chopper 33 can be oscillated in Y-axis direction. The circuit board 35 comprises a X-axis detector unit (a) disposed corresponding to the first light chopper 32, and a Y-axis detector unit (b) disposed corresponding to the second light chopper 33. The X-axis detector unit (a) is comprised of a light emitting element 36, and a plurality of digital light sensors 37. The Y-axis detector unit (b) is comprised of a light emitting element 36, an analog light sensor 38, and a digital light sensor 37. The movement of the second light chopper 33 causes the digital light sensor 37 of the Y-axis detector unit (b) to be induced or not induced, and the corresponding analog light sensor 38 is caused to change its output signal value as the light chopper 33 moves between the light emitting element 36 and the analog light sensor 38. The movement of the first light chopper 32 causes the digital light sensors 37 of the X-axis detector unit (a) to be induced or not induced. By means of the X-axis detector unit (a) and the Y-axis detector unit (b), the status detector 30 detects the status and provides a corresponding status signal output. Further, a coil 60 is provided corresponding to the light choppers 32, 33, and controlled to provide an intermittent high-frequency magnetic force for producing a damping effect against the light choppers 32, 33 to prevent the occurrence of "inertia oscillation phenomenon" (see FIG. 3A).

The microprocessor 3 processes the output signal of the status detector 30, and provides a corresponding output signal to the driving mechanism M, causing the X-axis motor M1 and Y-axis motor M2 of the driving mechanism M to be operated respectively.

Figure 4:
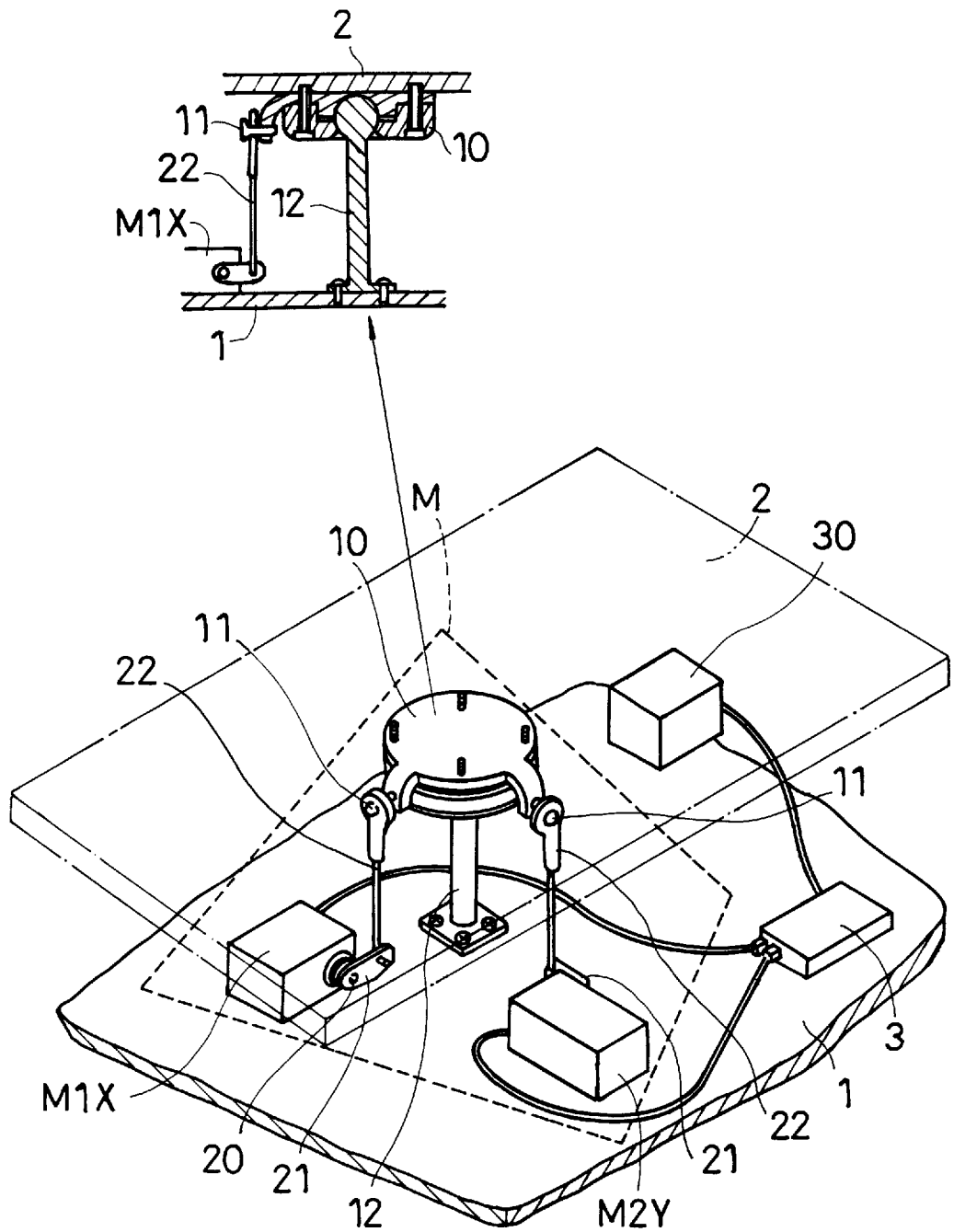
FIG. 4 is a perspective view of a level controller according to the present invention.

The driving mechanism M (see FIG. 4) comprises a connector 10 fixedly secured to the platform 2 at the bottom, an upright support 12 having a bottom end fixedly fastened to a base plate 1 and a top end connected to the connector 10 through a ball and socket joint, two drag bars 11 respectively connected to the connector 10 and arranged at right angles, a X-axis motor M1 and a Y-axis motor M2 respectively mounted on the base plate 1 at right angles and having a respective motor shaft 20 coupled with a respective crank 21, and two links 22 respectively connected between the cranks 21 of the motors M1, M2 and the drag bars 11.

Referring to FIG. 4 again, the status detector 30 is mounted on the platform 2 at the bottom side, and electrically connected to the microprocessor 3, which is mounted on the base plate 1 at a suitable location. The motors M1, M2 are electrically connected to the microprocessor 3. If the base plate 1 is not on an even horizontal plane, the platform 2 is relatively tilted, causing the first chopper 32 and the second chopper 33 to be respectively tilted. When the first chopper 32 and the second chopper 33 are tilted, the status is immediately detected by the corresponding light sensors 37, 38, thereby causing the status detector 30 to provide a corresponding output signal to the microprocessor 3. Upon receipt of the signal from the status detector 30, the microprocessor 3 immediately processes the signal, and then provides respective control signals to the X-axis motor M1 and the Y-axis motor M2 subject to the nature of the signal obtained from the status detector 30, thereby causing the X-axis motor M1 and the Y-axis motor M2 to turn the drag bars 11 through the cranks 21 and the links 22, so as to move the platform 2 to the horizontal position. When the platform 2 is on an even horizontal plane, the light choppers 32, 33 block the light from the light sensors 37, 38, and the microprocessor 3 is driven to stop the motors M1, M2.

Figure 5A:
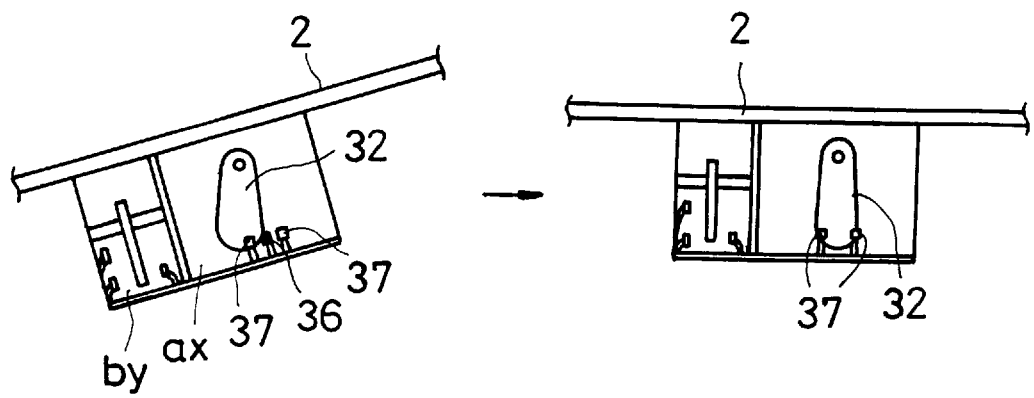
FIG. 5A is a schematic drawing showing the platform moved from a rightwardly tilted position to the horizontal position according to the present invention.
Figure 6A:
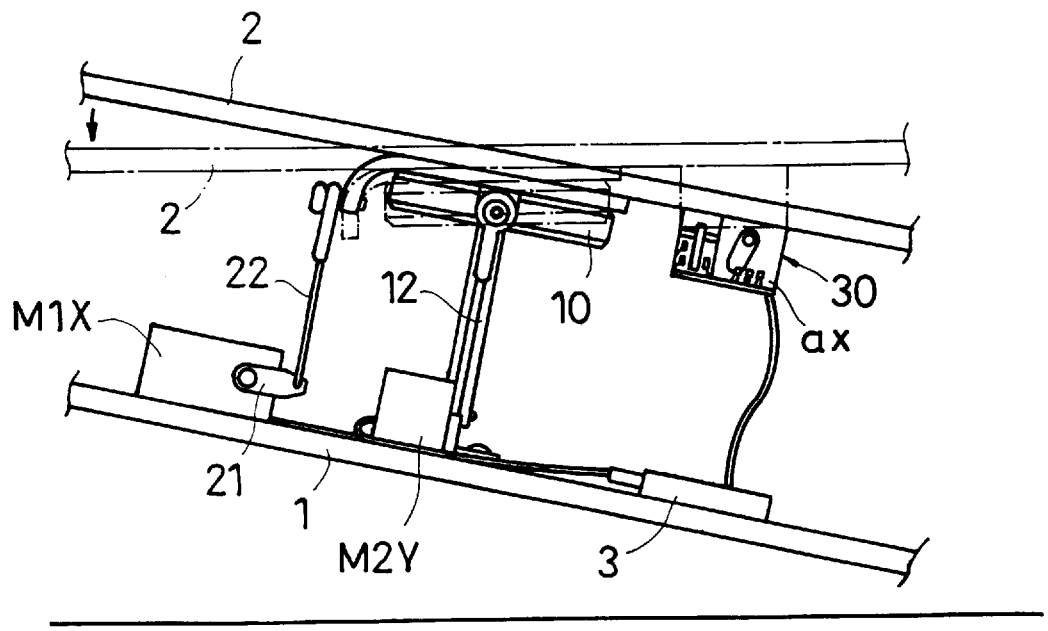
FIG. 6A is a schematic drawing showing the platform moved from a forwardly tilted position to the horizontal position according to the present invention.

Referring to FIGS. 5A and 6A, when the base plate 1 is tilted rightwards (or leftwards), the platform 2 is relatively tilted, causing the first light chopper 32 to be turned rightwards (or leftwards). When the first light chopper 32 is turned rightwards (or leftwards), the X-axis detector unit (a) is induced to provide a signal to the microprocessor 3, causing the microprocessor 3 to turn the X-axis motor M1 clockwise (or counter-clockwise) through an angle (the motors M1, M2 are servo motors), so as to lower (or lift) the corresponding link 22. When the link 22 is lowered (or lifted), the platform 2 is tilted leftwards (or rightwards) to the horizontal position.

Figure 5B:
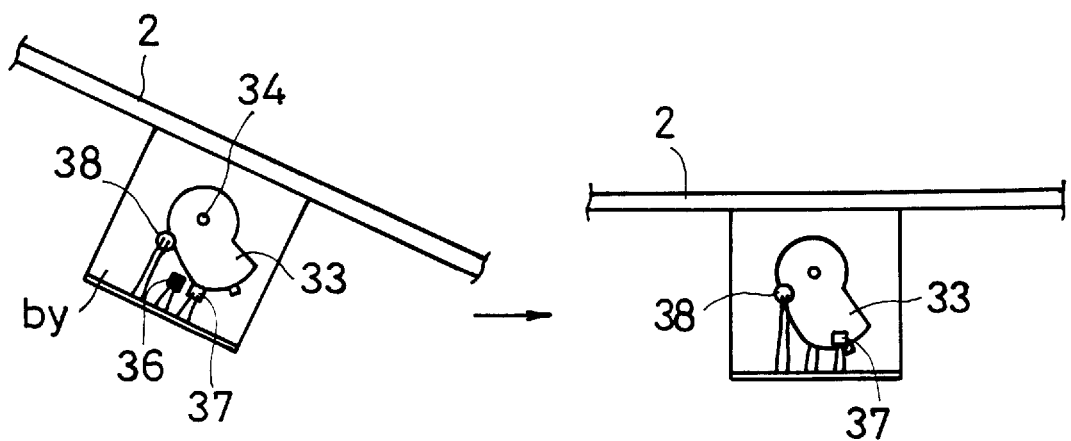
FIG. 5B is a schematic drawing showing the platform moved from a leftwardly tilted position to the horizontal position according to the present invention.
Figure 6B:
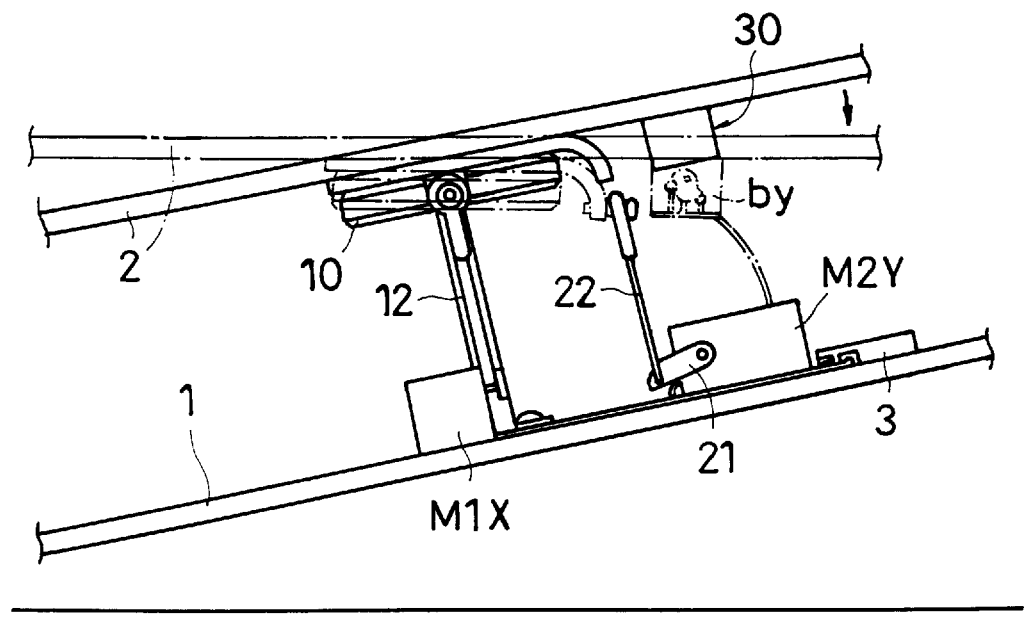
FIG. 6B is a schematic drawing showing the platform moved from a backwardly tilted position to the horizontal position according to the present invention.

Referring to Figures 5B and 6B, when the base plate 1 is tilted forwards (or backwards), the platform 2 is relatively tilted, causing the second light chopper 33 to be turned forwards (or backwards). When the first light chopper 32 is turned forwards (or backwards), the Y-axis detector unit (b) is induced to provide a signal to the microprocessor 3, causing the microprocessor 3 to turn the Y-axis motor M1 clockwise (or counter-clockwise) through an angle, so as to lower (or lift) the corresponding link 22. When the link 22 is lowered (or lifted), the platform 2 is tilted forwards (or backwards) to the horizontal position.

If the four sides (left, right, front and back sides) base plate 1 are all moved out of the horizontal position, the X-axis detector unit (a) and the Y-axis detector unit (b) are respectively induced to provide a respective signal to the microprocessor 3, causing the microprocessor 3 to turn the X-axis motor M1 and the Y-axis motor M2 respectively, and therefore the platform 2 is moved back to the horizontal position.

Figure 7:
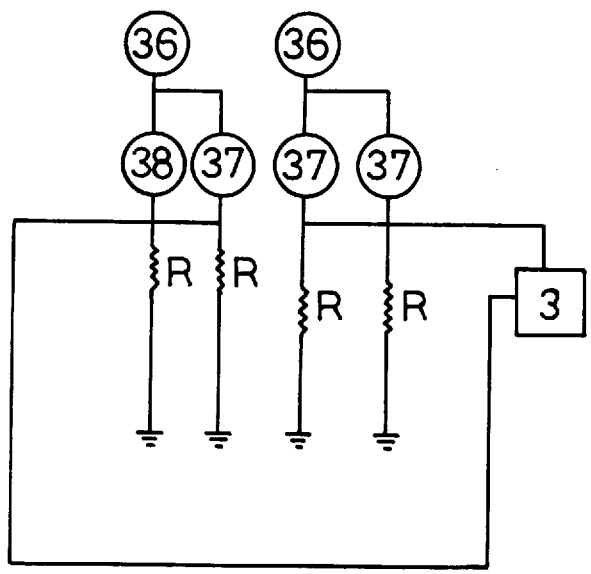
FIG. 7 is a circuit diagram of the light emitting elements and the light sensors of the status detector according to the present invention.

Referring to FIG. 7, the analog light sensor 38 complements the digital light sensors 37 with respect to temperature effects, to provide signals to the microprocessor 3, so that the position status detection of the status detector 30 is free from effects due to changes in ambient temperature.

Figure 8:
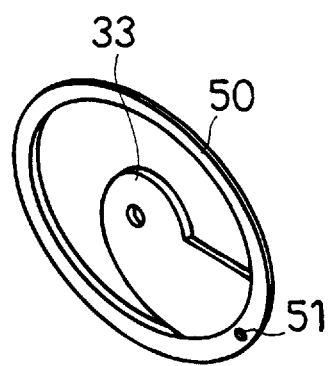
FIG. 8 is an elevational view of an alternate form of the second light chopper according to the present invention.

Referring to FIG. 8, a ring 50 may be mounted around the second light chopper 33, having a light hole 51 through which light passes.

Figure 9:
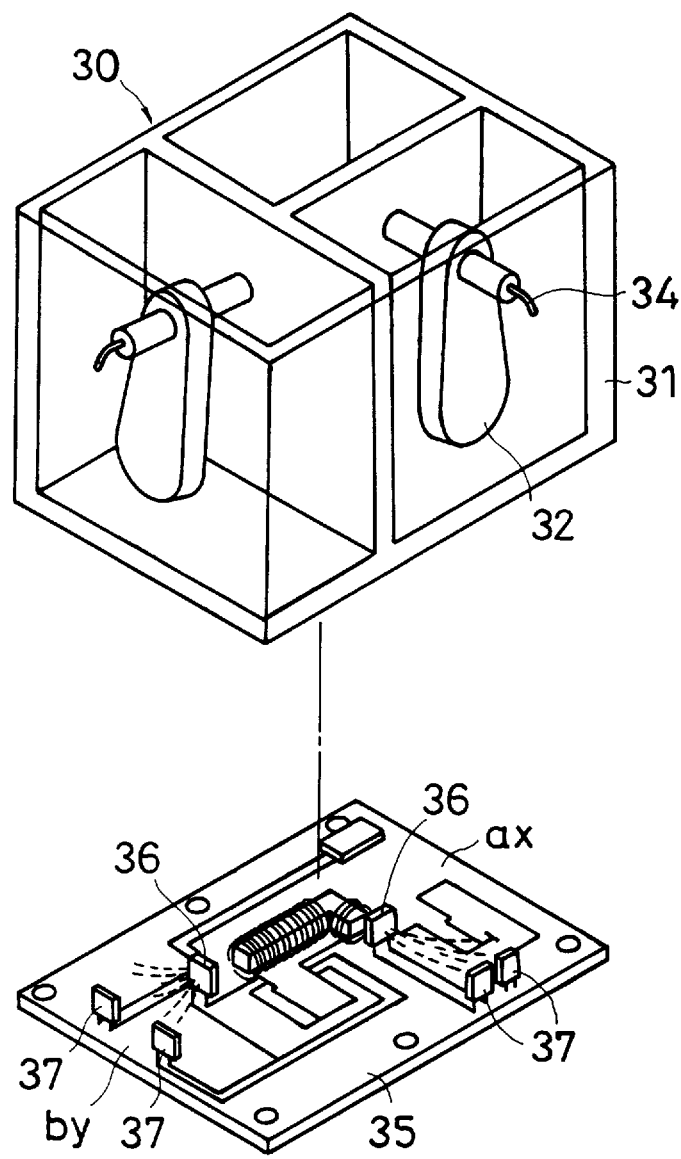
FIG. 9 is an exploded view of an alternate form of the status detector according to the present invention.

FIG. 9 shows an alternate form of the status detector 30 in which the Y-axis detector unit (b) and the Y-axis detector unit (a) are respectively comprised of a light emitting element 36 and two digital light sensors 37.

Figure 10:
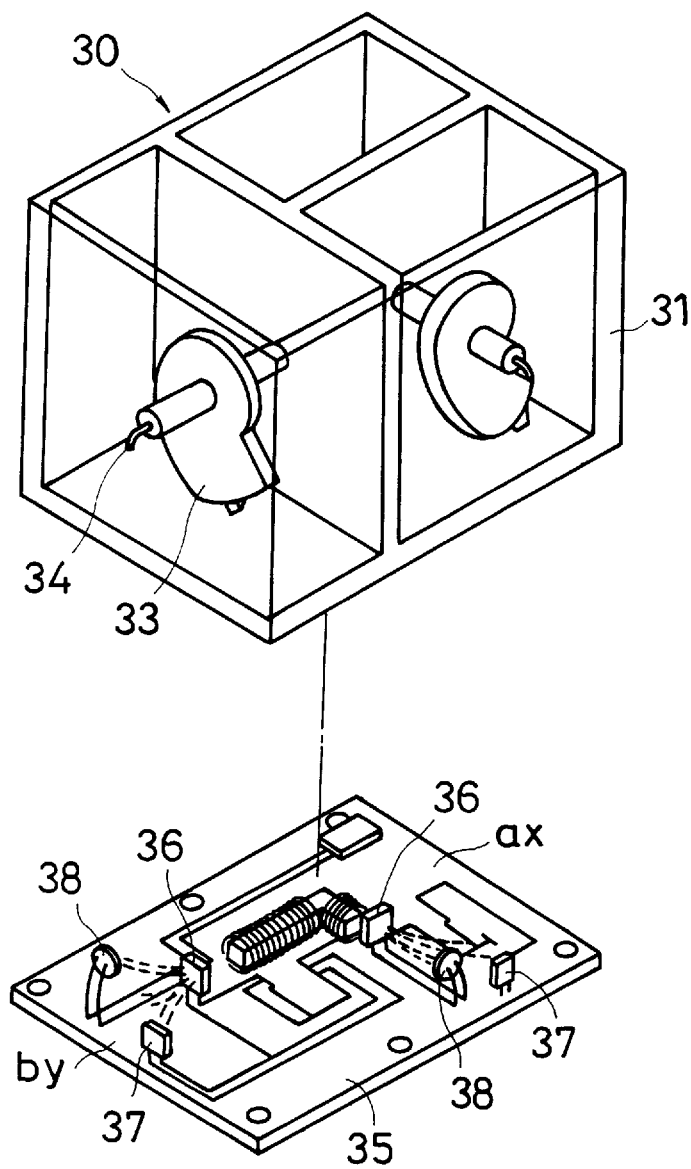
FIG. 10 is an exploded view of still another alternate form of the status detector according to the present invention.

FIG. 10 shows another alternate form of the status detector 30 in which the X-axis detector unit (a) and the Y-axis detector unit (b) are respectively comprised of a light emitting element 36, a digital light sensor 37, and an analog light sensor 38.

It is to be understood that the drawings are designed for purposes of illustration only, and are not intended as a definition of the limits and scope of the invention disclosed.

What the invention claimed is:

1. A level controller, comprising:

a base plate having an upright support;

a platform supported on and turned about said upright support and having a bottom side facing said base plate;

a status detector mounted on the bottom side of said platform to detect a position of said platform and to provide an output signal corresponding to a result of the detection, said status detector including an X-axis detector unit adapted for detecting an X-axis position of said platform, and a Y-axis detector unit adapted for detecting a Y-axis position of said platform, said X-axis detector unit including (a) a first light source, (b) first light sensor means, and (c) a first light chopper pivotally coupled to an X-axis axle and disposed between said first light source and said first light sensor means of said X-axis detector unit, said first light sensor means of said X-axis detector unit including an analog light sensor and a digital light sensor, said Y-axis detector unit including (a) a second light source, (b) second light sensor means, and (c) a second light chopper pivotally coupled to a Y-axis axle and disposed between said second light source and said second light sensor means of said Y-axis detector unit, said first light chopper of said X-axis detector unit being tilted when said platform is tilted in an X-axis direction, thereby causing said first light sensor means of said X-axis detector unit to provide an output signal corresponding to respective movement of said platform, said second light chopper of said Y-axis detector unit being tilted when said platform is tilted in a Y-axis direction, thereby causing said second light sensor means of said Y-axis detector unit to provide an output signal corresponding to respective movement of said platform;

a driving mechanism mounted on said base plate and controlled to displace said platform for maintaining said platform in an even horizontal plane; and, a microprocessor mounted on said base plate for controlling said driving mechanism responsive to said output signal of said status detector.

2. A level controller, comprising:

a base plate having an upright support;

a platform supported on and turned about said upright support and having a bottom side facing said base plate;

a status detector mounted on the bottom side of said platform to detect a position of said platform and to provide an output signal corresponding to a result of the detection, said status detector including an X-axis detector unit adapted for detecting an X-axis position of said platform, and a Y-axis detector unit adapted for detecting a Y-axis position of said platform, said X-axis detector unit including (a) a light source, (b) first light sensor means, and (c) a light chopper pivotally coupled to an X-axis axle and disposed between the light source and light sensor means of said X-axis detector unit, said Y-axis detector unit including (a) a second light source, (b) second light sensor means, and (c) a second light chopper pivotally coupled to a Y-axis axle and disposed between said second light source and said second light sensor means of said Y-axis detector unit, said second light sensor light sensor means of said Y-axis detector unit including an analog light sensor and a digital light sensor, said first light chopper of said X-axis detector unit being tilted when said platform is tilted in an X-axis direction, thereby causing said first light sensor means of said X-axis detector unit to provide an output signal corresponding to respective movement of said platform, said second light chopper of said Y-axis detector unit being tilted when said platform is tilted in a Y-axis direction, thereby causing said second light sensor means of said Y-axis detector unit to provide an output signal corresponding to respective movement of said platform;

a driving mechanism mounted on said base plate and controlled to displace said platform for maintaining said platform in an even horizontal plane; and, a microprocessor mounted on said base plate for controlling said driving mechanism responsive to said output signal of said status detector.

* * * * *